Nov. 21, 1933.  E. R. EVANS  1,936,191
CABLE OPERATED BRAKE
Filed March 25, 1932  2 Sheets-Sheet 2
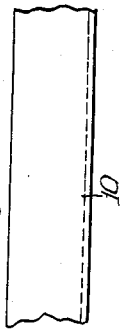
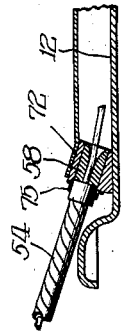
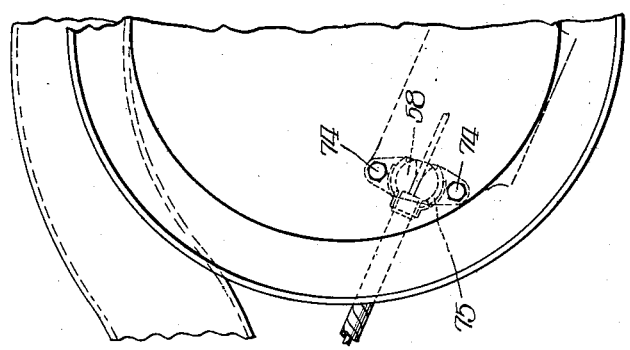
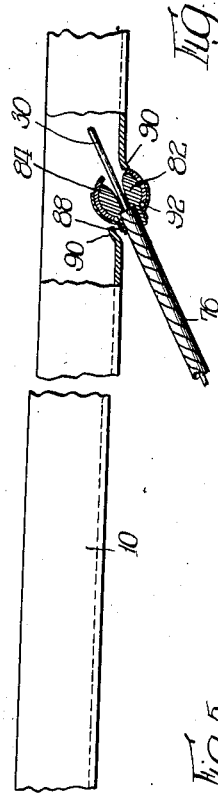
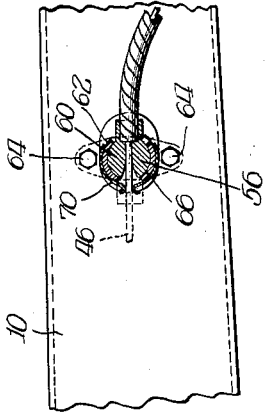
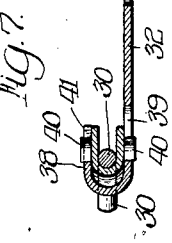
Inventor:
Edwin R. Evans,
By Wilkinson Huxley Byron & Knight
Attys.

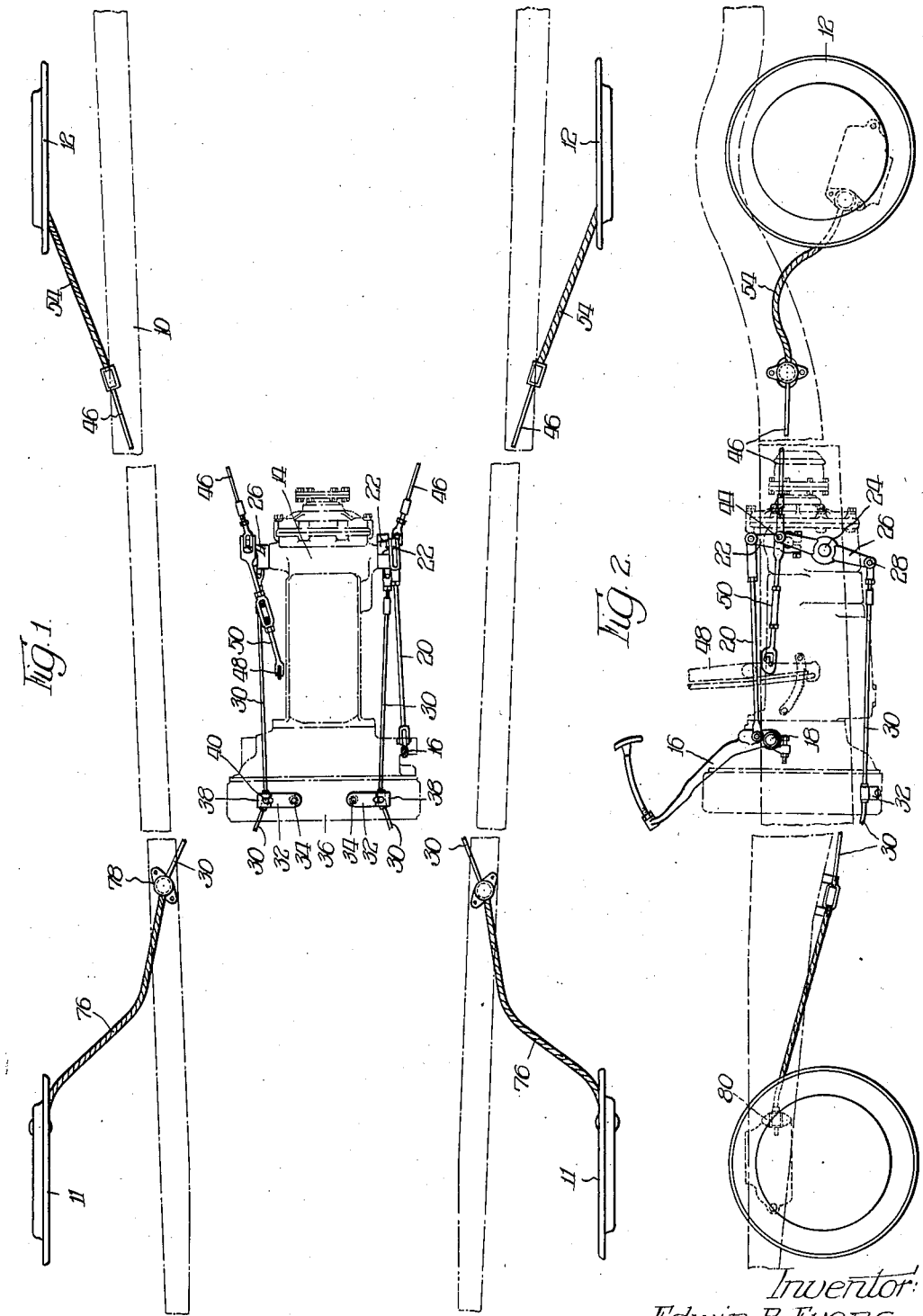

Patented Nov. 21, 1933

1,936,191

UNITED STATES PATENT OFFICE 1,936,191

CABLE OPERATED BRAKE

Edwin R. Evans, Chicago, Ill.

Application March 25, 1932. Serial No. 601,099

10 Claims. (Cl. 188—10)

This invention relates to improvements in a brake linkage for motor vehicles particularly a brake system in which the four-wheel brakes of a vehicle are actuated by cables which pass through cable conduits extending between the wheel brakes and the chassis frame.

It is an object of the present invention to support the cable receiving conduits by pivotal connections to the frame and to the wheel brakes.

It is further an object of the invention to support the cable receiving conduits by pivotal connections to the frame and the backing plates of the wheel brakes which confine flexure of the cable conduits to substantially one plane.

A further object of the invention consists in the provision of a brake system for a motor vehicle in which the front cable conduits are pivoted to the backing plates of the front wheel brakes and to the frame for flexure in substantially horizontal planes and the rear brake conduits are pivotally supported by the backing plates of the rear wheel brakes and by the chassis frame for flexure substantially in vertical planes.

Further and additional objects and advantages of the present invention will be more readily apparent from the following description taken in connection with the attached drawings, in which Figure 1 is a partially broken plan view of the brake linkage, portions of the chassis being diagrammatically shown in phantom;

Figure 2 is a side elevation of the linkage shown in Figure 1;

Figure 3 is a broken section taken through the ends of one of the rear cable conduits;

Figure 4 is a side elevation, partially in section, of the cable conduit shown in Figure 3;

Figure 5 is a broken section taken through the ends of a front cable conduit showing a modification from that of Figures 1 and 2;

Figure 6 is a detail section taken through one of the ends of the cable conduit shown in Figure 5, Figure 7 is a detail section through a relay support for a cable, and Figure 8 is a detail section taken through a modified design of the cable conduit support, such as illustrated in Figure 5.

In Figure 1, 10 indicates the chassis frame, 11—11 represent the backing plates of the front wheel brakes, 12—12 indicate the backing plates of the rear wheel brakes and 14 is the housing of the power brake. The foot pedal 16 is carried by pivot 18 and is pivotally connected by rod 20 to the input lever arm 22 of the power brake. The output rock shaft 24 extends through the power brake casing and carries on each side of the casing a double arm brake lever 26. The lower ends 28 of the levers 26 are connected to cables 30 extending forward of the vehicle for operation of the front wheel brakes. A pair of relays 32—32 are swiveled by bolts 34 to the bottom of the fly-wheel housing 36. The relays are substantially transverse to the longitudinal center line of the car and, as shown in Figure 7, are made of flat steel curved up at their outer ends as at 38 with a slot 39 in the bottom face and a notch 41 in the upper face so that ears 40 may be assembled by dropping one end into the bottom slot and then assembilng the other end in the notch 41. The ears 40 are U-shaped to receive cables 30 and may be clamped thereto. The relays are desirable in order that the cables 30 will clear obstructions on the chassis. The upper ends 44 of the levers 26 are connected to rearwardly extending cables 46. It is to be understood that the levers 26 are mounted on the rock shaft 24 with freedom for lost motion in order that at least one of the levers 26 may be operated by an emergency lever 48 through a slack-take-up link 50.

As shown in detail in Figures 3 and 4 the cables 46 extend through openings 52 in the chassis frame and through cable conduits 54 for operative connection with the rear wheel brakes. The ends of the cable conduits 54 are connected to cylindrical pieces 56 and 58. The outer ends of the pieces 56 and 58 have flared openings 60 for contacting with the cables 46. Each of the cylindrical pieces 56 is mounted in a bracket 62 secured by bolts 64 to the inner side of the chassis frame 10 and the pieces 56 are free to swing about a horizontal axis as permitted by the confining cylindrical walls 66 of the brackets 62. The openings 52 in the chassis frame have flared edges 68. A dust cap member 70 is shown fitted on the cables 46 and overlapping the cylindrical walls 66 of the bracket 62.

The cylindrical pieces 58 are similarly fitted in bracket members 72 fastened by bolts 74 to the inner side of the backing plates 12 of the rear wheel brakes. The cable conduits 54 at the ends swiveled to the brackets 72 have dust caps 75 covering the cylindrical walls of the brackets 72. It will be apparent that the swiveled connections at the ends of the cable conduits 54 tend to maintain the conduits flexed in substantially vertical planes throughout the vertical movement of the rear wheel backing plates 12 relative to the chassis frame 10.

In a similar manner the cable conduits 76, which receive the front cables 30, are swiveled at their rear ends to brackets 78 secured to the bottom of the sides of the chassis frame 10. At their front ends, the cable conduits 76 are swiveled to the brackets 80 secured to the front wheel backing plates 11. It will be noted however that the ends of the front cable conduits 76 are swiveled about vertical axes instead of horizontal axes, as are the rear wheel conduits 54. The conduits 76 are therefore maintained flexed in substantially horizontal planes throughout the swiveling movement of the front wheels. It might be more correct to say that the front cable conduits appear to lie straight when viewed from the side of the chassis, as is apparent in Figure 2.

In the detail view of Figure 5, the front ends of the cable conduit 76 are mounted as shown in Figure 2 but at their rear ends the cable conduits are secured to cylindrical pieces 82 mounted in brackets 84 secured to the sides of the chassis frame 10, similar to Figure 3, instead of to the bottom of the chassis frame as in Figures 1 and 2. The cables 30 therefore extend through openings 88 in the chassis frame having flared edges 90. Dust caps 92 are secured to the cable conduits 76 overlapping the cylindrical walls of the brackets 84.

Figure 8 illustrates a modified design for the cable conduit support. The end of the cable conduit 76 is joined to a block 94, which is mounted for rotation in a fixed bearing 96 secured to the chassis frame 10. A dust cap 98, secured to one end 100 of the block 94, overlaps the outer walls of the bearing 96. The block 94 has a straight opening 102 extending past the center of rotation of the block 94 in bearing 96. The outer portion of the opening 102 is flared as at 104 and the brake actuating cable extending through the cable conduit 76 extends through the block 94. As indicated, the cable, by its bearing on the straight portion of the opening 102, controls the angle of the conduit 76 with respect to the frame 10. It will be noted that if the straight portion were stopped at the center of rotation of the block, that this action would not occur. This modified construction may be employed at all points at which the cable conduit is connected to the chassis frame in place of the construction shown in the other figures.

The constructions described permit the use of shorter cable conduit connections because it is not necessary to allow sufficient conduit to insure tangential connection of the cable conduits with the backing plates and the frame. The use of shorter conduits also means that the bends in the conduits are of smaller curvature and since the mechanical loss of a cable sliding through a conduit is controlled by the angle of contact, it will be obvious that there is less possibility for mechanical loss than when larger bends in the cable conduits are used.

I claim:

1. In a cable actuated brake system for motor vehicles, a flexible cable conduit, a brake actuating cable extending through the cable conduit and means pivotally connecting each end of the cable conduit to a brake backing plate and to the frame respectively.

2. In a cable actuated brake system for motor vehicles, a flexible cable conduit, a brake actuating cable extending through the cable conduit and means supporting each end of the cable conduit by a brake backing plate and by the frame respectively for pivotal movement in one plane.

3. In a cable actuated brake system for motor vehicles, a flexible cable conduit, a brake actuating cable extending through the cable conduit, a pivotal connection between one end of the cable conduit and a brake backing plate and a pivotal connection between the other end of the cable conduit and the chassis frame.

4. In a cable actuated brake system for motor vehicles, a chassis frame, a backing plate for a wheel brake of the vehicle, a flexible cable conduit, a brake actuating cable extending through the cable conduit, a cylindrical piece fixed to each end of the cable conduit, each of said cylindrical pieces having a flared opening for the passage of the cable, means supporting one end of the cable conduit by the cylindrical piece for pivotal movement with respect to the backing plate and means supporting the other end of of the cable conduit by the cylindrical piece for pivotal movement with respect to the chassis frame.

5. In a cable actuated brake system for motor vehicles, a chassis frame, backing plates associated with each of the four wheel brakes of the vehicle, a cable conduit extending between each of said backing plates and said chassis frame, brake actuating cables extending through said cable conduits and means pivotally supporting one end of each of said cable conduits on a backing plate and the other end of each of said cable conduits on the chassis frame.

6. In a cable actuated brake system for motor vehicles, a chassis frame, backing plates associated with the four wheel brakes of the vehicle, flexible cable conduits extending between each of said backing plates and said chassis frame, brake actuating cables passing through each of the cable conduits, means limiting flexing of the cable conduits at one end of the vehicle to one plane and means limiting flexure of the cable conduits at the other end of the vehicle to a plane transverse to the plane of flexure of the cable conduits at the other end of the vehicle.

7. In a cable actuated brake system for motor vehicles, a chassis frame, backing plates associated with the four wheel brakes of the vehicle, flexible cable conduits pivotally supported at one end by each of said backing plates and pivotally supported at their other ends adjacent openings formed in the chassis frame and brake actuating cables extending through the openings of said chassis frame and through said cable conduits.

8. In a cable actuated brake system for motor vehicles, a chassis frame having an opening therein, a bracket fixed to the chassis frame adjacent said opening, a cylindrical piece pivotally supported by said bracket, a flexible cable conduit fixed at one end to said cylindrical piece, said cylindrical piece having a flared opening therein and a brake actuating cable extending through the frame and passing through the flared opening of said cylindrical piece and through said cable conduit.

9. In a cable-actuated brake system for motor vehicles, a chassis frame, an abutment member pivotally supported by said chassis frame, a flexible cable conduit fixed at one end to said abutment member, said abutment member having an opening extending therethrough transverse to the axis of the pivotal support therefor, a brake actuating cable extending through said cable conduit and the opening in said abutment member, the opening in said abutment member being flared, the flared portion beginning at a point offset from the pivotal axis of said abutment member whereby the cable, bearing upon said flared portion, tends to rotate said abutment member into alignment therewith.

10. In a cable-actuated brake system for motor vehicles, a chassis frame having an opening therein, an abutment member rotatably supported by said chassis frame adjacent said opening, a flexible cable conduit fixed at one end to said abutment member, said abutment member having a passageway therethrough extending transverse to the axis of rotation of said abutment member, a brake actuating cable extending through said cable conduit and through the passageway of said abutment member, said passageway having a flared portion for engagement with the cable on the other side of the axis of rotation of said abutment member from the cable conduit, whereby the bearing of said cable upon said flared portion of said passageway produces rotation of said abutment member.

EDWIN R. EVANS.